(12) United States Patent
Ye et al.

(10) Patent No.: US 10,191,290 B2
(45) Date of Patent: Jan. 29, 2019

(54) VEHICLE, HEAD-UP DISPLAYING SYSTEM AND METHOD FOR ADJUSTING HEIGHT OF PROJECTION IMAGE THEREOF

(71) Applicant: BYD COMPANY LIMITED, Shenzhen, Guangdong (CN)

(72) Inventors: Riyi Ye, Shenzhen (CN); Ming Li, Shenzhen (CN); Yifeng Wu, Shenzhen (CN)

(73) Assignee: BYD COMPANY LIMITED (CN)

( * ) Notice: Subject to any disclaimer, the term of this patent is extended or adjusted under 35 U.S.C. 154(b) by 0 days.

(21) Appl. No.: 15/536,050

(22) PCT Filed: Dec. 25, 2015

(86) PCT No.: PCT/CN2015/099015
§ 371 (c)(1),
(2) Date: Jun. 14, 2017

(87) PCT Pub. No.: WO2016/101917
PCT Pub. Date: Jun. 30, 2016

(65) Prior Publication Data
US 2017/0329142 A1  Nov. 16, 2017

(30) Foreign Application Priority Data
Dec. 25, 2014  (CN) .......................... 2014 1 0820463

(51) Int. Cl.
*G06F 3/01* (2006.01)
*G02B 27/01* (2006.01)
(Continued)

(52) U.S. Cl.
CPC .......... *G02B 27/0179* (2013.01); *B60K 35/00* (2013.01); *B60K 37/04* (2013.01);
(Continued)

(58) Field of Classification Search
CPC ......... G06F 3/011–3/014; B60K 35/00; B60K 37/04; B60K 37/06
(Continued)

(56) References Cited

U.S. PATENT DOCUMENTS

| 4,831,366 A | 5/1989 | Iino |
| 5,034,732 A | 7/1991 | Iino |

(Continued)

FOREIGN PATENT DOCUMENTS

| CN | 102608760 A | 7/2012 |
| JP | 2005247224 A | 9/2005 |
| JP | 2009196473 A | 9/2009 |

OTHER PUBLICATIONS

Trigonometrical ratios in a right-angled triangle, 2009, mathcentre.*
(Continued)

*Primary Examiner* — Roberto W Flores
(74) *Attorney, Agent, or Firm* — Calfee, Halter & Griswold LLP

(57) ABSTRACT

A vehicle, a head-up displaying system and a method for adjusting a height of a projection image thereof are provided. The system includes a projector, a camera, a seat detecting module and a head-up controller. The camera is configured to detect an image having locations of the eyes of the driver and a predetermined reference point. The seat detecting module is configured to detect a position of a seat of the driver in the vehicle so as to obtain an actual horizontal distance between the eyes of the driver and the predetermined reference point. The head-up controller is configured to adjust a height of the projection image projected by the projector automatically according to the actual vertical distance. The system automatically controls the
(Continued)

height of the projection image, and the projection image may be comfortable for the driver to view without any manual intervenes.

13 Claims, 6 Drawing Sheets

(51) Int. Cl.
*B60K 35/00* (2006.01)
*G02B 27/00* (2006.01)
*B60K 37/04* (2006.01)
*G06T 7/73* (2017.01)
*F16H 25/20* (2006.01)

(52) U.S. Cl.
CPC .............. *F16H 25/20* (2013.01); *G02B 27/00* (2013.01); *G02B 27/0101* (2013.01); *G02B 27/0149* (2013.01); *G06F 3/012* (2013.01); *G06F 3/013* (2013.01); *G06T 7/74* (2017.01); *B60K 2350/1072* (2013.01); *B60K 2350/2013* (2013.01); *B60K 2350/2052* (2013.01); *B60K 2350/352* (2013.01); *B60K 2350/405* (2013.01); *B60K 2350/901* (2013.01); *F16H 2025/209* (2013.01); *G02B 2027/011* (2013.01); *G02B 2027/014* (2013.01); *G02B 2027/0138* (2013.01); *G02B 2027/0159* (2013.01); *G02B 2027/0163* (2013.01); *G02B 2027/0169* (2013.01); *G02B 2027/0181* (2013.01); *G02B 2027/0187* (2013.01); *G06T 2207/30201* (2013.01)

(58) Field of Classification Search
USPC .......................................................... 345/7
See application file for complete search history.

(56) References Cited

U.S. PATENT DOCUMENTS

| | | | |
|---|---|---|---|
| 5,204,666 A * | 4/1993 | Aoki | B60K 37/02 340/980 |
| 5,506,595 A | 4/1996 | Fukano et al. | |
| 5,734,357 A | 3/1998 | Matsumoto | |
| 2006/0071877 A1* | 4/2006 | Kanamori | G02B 17/023 345/7 |
| 2007/0085980 A1* | 4/2007 | Lerner | G02B 17/0657 353/99 |
| 2009/0174658 A1* | 7/2009 | Blatchley | G06F 1/1601 345/158 |
| 2009/0303158 A1* | 12/2009 | Takahashi | G02B 27/0093 345/7 |
| 2010/0066832 A1* | 3/2010 | Nagahara | G02B 7/1822 348/148 |
| 2011/0170023 A1* | 7/2011 | Ishida | B60K 35/00 348/837 |
| 2011/0227717 A1* | 9/2011 | Kumon | G02B 27/01 340/441 |
| 2011/0235185 A1* | 9/2011 | Kanamori | G02B 27/01 359/630 |
| 2013/0072297 A1* | 3/2013 | Seegers | A63F 13/06 463/31 |
| 2015/0145761 A1* | 5/2015 | Liao | G06K 9/00221 345/156 |
| 2015/0170343 A1* | 6/2015 | Kwak | G02B 27/0101 345/647 |
| 2016/0209663 A1* | 7/2016 | Hirokawa | G02B 27/0101 |
| 2017/0160545 A1* | 6/2017 | Sugiyama | B60K 35/00 |
| 2017/0309257 A1* | 10/2017 | Akita | G09G 5/38 |

OTHER PUBLICATIONS

International Search Report and Written Opinion from PCT/CN2015/099015 dated Apr. 1, 2016.

* cited by examiner

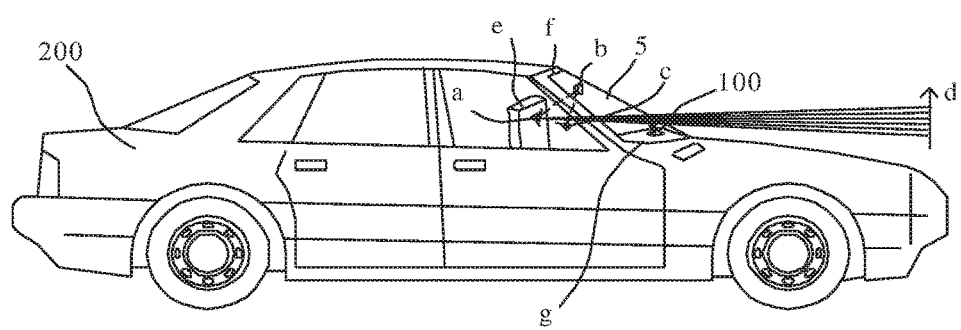
Fig. 1
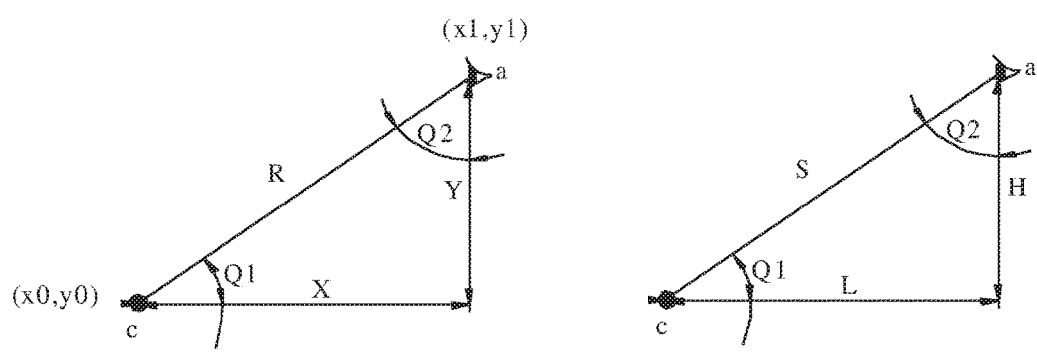
Fig. 2a                                    Fig. 2b

VEHICLE, HEAD-UP DISPLAYING SYSTEM AND METHOD FOR ADJUSTING HEIGHT OF PROJECTION IMAGE THEREOF

CROSS REFERENCE TO RELATED APPLICATION

This application is based on International Application No. PCT/CN2015/099015, filed on Dec. 25, 2015, which claims priority and benefits of Chinese Patent Application No. 201410820463.2, filed with State Intellectual Property Office, P. R. C. on Dec. 25, 2014, the entire content of which are incorporated herein by reference.

FIELD

The present disclosure generally relates to the field of vehicle, and more particularly to the field of head-up displaying system.

BACKGROUND

With the improvement of the living standard, there are more requirements for the vehicles. Presently, some vehicles are provided with head-up displaying systems. The head-up displaying system is disposed on a dashboard of the vehicle, projects information onto a front windshield in a form of text and image using the optical reflection principle. And a height of the projection image and that of eyes of a driver are generally at the same level. The driver may view a virtual image reflected by the front windshield with the projection image projected by the head-up displaying system. In this way, it is easy for the driver to combine a scene outside and the information displayed by the head-up displaying system during driving. The driver may view navigation information, the speed of the vehicle and other information without bowing his/her head, such that the problem of distracting the attention from the road ahead may be avoided, thus improving the driving security.

In the related art, the projection image of the head-up displaying system is limited to a certain position. However, the height differs from people to people. There is a requirement for adjusting the height of the projection image.

SUMMARY

The present disclosure provides a vehicle, a head-up displaying system and a method for adjusting a height of a projection image of a head-up displaying system, so as to solve the problem that it is inconvenient and hard to find an appropriate position at which the projection image may be viewed by the driver comfortably.

According to embodiments of a first aspect of the present disclosure, there is provided a head-up displaying system. The head-up displaying system comprises: a projector, disposed in the vehicle, and configured to project a projection image onto a front windshield such that the projection image is reflected into eyes of a driver; a camera, fixedly disposed in the vehicle and in front of the eyes of the driver, and configured to detect an image having locations of the eyes of the driver and a predetermined reference point; a seat detecting module, configured to detect a position of a seat of the driver in the vehicle so as to obtain an actual horizontal distance between the eyes of the driver and the predetermined reference point in a horizontal direction; and a head-up controller, configured to obtain the image and the actual horizontal distance, to process the image so as to obtain a position relation between the eyes of the driver and the predetermined reference point in the image, to generate an actual vertical distance between the eyes of the driver and the predetermined reference point according to the position relation and the actual horizontal distance, and to adjust a height of the projection image from the projector automatically according to the actual vertical distance.

The head-up displaying system according to the present disclosure automatically detects the image having locations of the eyes of the driver and the predetermined reference point by the camera, automatically detects the position of the seat of the driver by the seat detecting module so as to obtain the actual horizontal distance between the seat and the predetermined reference point, and then calculates by the head-up controller the actual vertical distance between the eyes of the driver and the predetermined reference point and controls the height of the projection image of the projector according to the actual vertical distance. Without any manual intervenes, the projection image may be positioned at the appropriate position where the projection image may be viewed by the driver comfortably.

According to embodiments of a second aspect of the present disclosure, there is provided a vehicle. The vehicle comprises a head-up displaying system described above.

The vehicle according to the present disclosure provided with a head-up displaying system. The head-up displaying system automatically detects the image having locations of the eyes of the driver and the predetermined reference point by the camera, automatically detects the position of the seat of the driver by the seat detecting module so as to obtain the actual horizontal distance between the seat and the predetermined reference point, and then calculates by the head-up controller the actual vertical distance between the eyes of the driver and the predetermined reference point and controls the height of the projection image of the projector according to the actual vertical distance. Without any manual intervenes, the projection image may be positioned at the appropriate position where the projection image may be viewed by the driver comfortably.

According to embodiments of a third aspect of the present disclosure, there is provided a method for adjusting a height of a projection image of a head-up displaying system. The head-up displaying system is a head-up displaying system described above. The method comprises: detecting the position of the seat of the driver in the vehicle so as to obtain the actual horizontal distance between the eyes of the driver and the predetermined reference point in the horizontal direction by the seat detecting module; obtaining the image and the actual horizontal distance by the head-up controller; processing the image so as to obtain the position relation between the eyes of the driver and the predetermined reference point in the image by the head-up controller; generating the actual vertical distance between the eyes of the driver and the predetermined reference point according to the position relation and the actual horizontal distance by the head-up controller; and adjusting the height of the projection image projected from the projector automatically according to the actual vertical distance by the head-up controller.

With the method for adjusting a height of a projection image of a head-up displaying system according to the present disclosure, the image having locations of the eyes of the driver and the predetermined reference point is automatically detected by the camera, the position of the seat of the driver is automatically detected by the seat detecting module so as to obtain the actual horizontal distance between the seat and the predetermined reference point, and then the actual vertical distance between the eyes of the driver and the predetermined reference point is calculated by the head-up controller and the height of the projection image of the projector is controlled according to the actual vertical distance. Without any manual intervenes, the projection image may be positioned at the appropriate position where the projection image may be viewed by the driver comfortably.

According to embodiments of a fourth aspect of the present disclosure, there is provided a non-transitory computer-readable storage medium having stored therein instructions that, when executed by a processor of a device, causes the device to perform a method according to the third aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a schematic diagram of a head-up displaying system according to a specific embodiment of the present disclosure;

FIG. 2a is a schematic diagram illustrating a triangular relationship of the eyes and the predetermined reference point in an image according to a specific embodiment of the present disclosure;

FIG. 2b is a schematic diagram illustrating a triangular relationship of the eyes and the predetermined reference point in actual scene according to a specific embodiment of the present disclosure;

DETAILED DESCRIPTION

Figure 3:
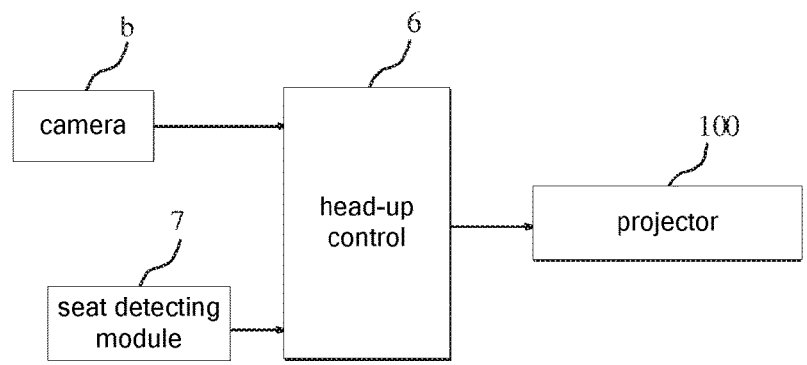
FIG. 3 is a block diagram of a head-up displaying system according to a specific embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Embodiment 1

In this embodiment, there is provided a head-up displaying system. As shown in FIGS. 1 and 3, the head-up displaying system comprises a projector 100, a camera b, a seat detecting module 7 and a head-up controller 6.

The projector 100 is disposed in a vehicle 200, and is configured to project a projection image d onto a front windshield such the projection image d is reflected into eyes a of a driver.

The camera b is fixedly disposed in the vehicle 200 and in front of the eyes a of the driver, and configured to detect an image having locations of the eyes a of the driver and a predetermined reference point c.

The seat detecting module 7 is configured to detect a position of a seat e of the driver in the vehicle 200 so as to obtain an actual horizontal distance between the eyes a of the driver and the predetermined reference point c in a horizontal direction.

The head-up controller 6 is configured to obtain the image detected by the camera b and the actual horizontal distance obtained by the seat detecting module 7, to process the image so as to obtain a position relation between the eyes a of the driver and the predetermined reference point c in the image, to generate an actual vertical distance between the eyes a of the driver and the predetermined reference point c according to the position relation and the actual horizontal distance, and to adjust a height of the projection image d from the projector 100 automatically according to the actual vertical distance.

It is discovered that, since the driver needs sit on the sear e, the position of the driver in the horizontal direction is generally unchanged even though different persons sit on the seat e to serve as the driver, i.e. the position of eyes a of the driver sitting on the seat e may be obtained by obtaining the position of the seat e. Based on this, the actual horizontal distance between the eyes a of the driver and the predetermined reference point c may be obtained by detecting the position of the seat e. Although there may be a tiny error due to the size of the driver, the effect of the tiny error during the adjustment of the height of the projection image is small. The average position of the eyes a of the driver sitting on the seat e may be obtained through statistics, thus the average actual horizontal distance between the eyes a of the driver and the predetermined reference point c in the horizontal direction may be calculated. The above-mentioned tiny error may be corrected by means of correcting. For example, a more accurate relationship between the eyes a of the driver and the seat e may be obtained by adding a correction coefficient obtained through experiment of experience to the position of seat e of the driver. In this way, the actual horizontal distance between the eyes a of the driver and the predetermined reference point c is obtained by obtaining the position of the seat e.

The seat detecting module 7 may be a position sensor disposed separately, and may identify information on the position of the seat e. The seat detecting module 7 has been disposed in some vehicles 200. Therefore, by using the seat detecting module 7, the head-up controller 6 may read data from the seat detecting module 7 via the CAN bus. If the vehicle 200 does not have the seat detecting module 7, the seat detecting module 7 needs to be disposed. Generally, the existing seat detecting module 7 disposed in the vehicle 200 is grouped into a seat controlling module, and controlled by the seat controlling module. However, the function of the seat detecting module 7 is not affected. So it is no problem to group the seat detecting module 7 into the head-up controller 6.

The camera b may be disposed at any location where the eyes a of the driver and the predetermined reference point c may be photographed simultaneously in the vehicle 200. For example, the camera b may be disposed on the dashboard g in the vehicle 200, or on the windshield 5, or at the top f of the vehicle 200.

The head-up controller 6 is provided with an image processing module inside or outside. The image processing module is configured to process the image so as to obtain the position relation between the eyes a of the driver and the predetermined reference point c in the image, i.e. the head-up controller 6 has an image processing function. Or, the head-up controller 6 may process the image obtained by the camera b by the image processing module disposed outside the head-up controller 6.

Figure 4:
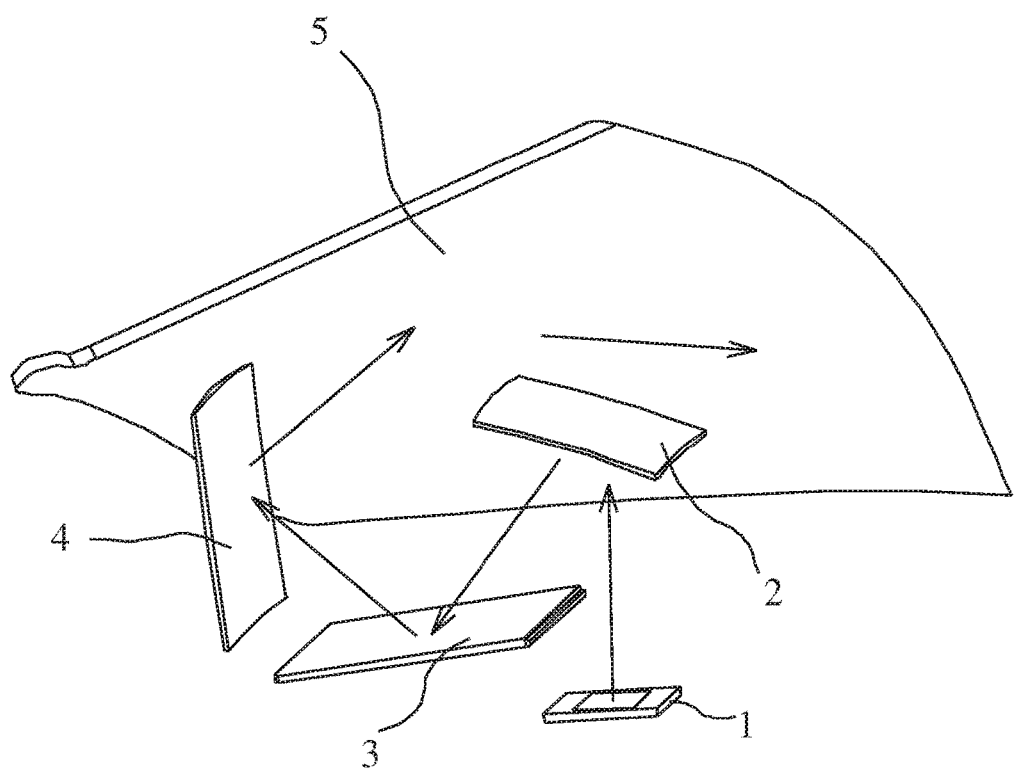
FIG. 4 is a schematic diagram illustrating a light path in a head-up displaying system according to a specific embodiment of the present disclosure.

As an implementation, in the head-up displaying system according to the present disclosure, the projector 100 comprises a display component 1 and a three-mirror optical assembly, as shown in FIG. 4. The three-mirror optical assembly is positioned in an optical path of an emergent light of the display component 1 and configured to reflect the projection image projected by the display component 1 onto the front windshield 5 of the vehicle 200 such that the front windshield 5 reflects the projection image into the eyes a of the driver.

The three-mirror optical assembly comprises a zoom lens assembly 2, an image quality compensation lens assembly 3 and a front windshield compensation lens assembly 4 sequentially disposed in the optical path of the emergent light.

The front windshield compensation lens assembly 4 comprises a bracket 42, a housing 43, an angle adjusting component 44 and a front windshield compensation lens 41. The front windshield compensation lens 41 is configured to compensate for an image distortion caused by the front windshield 5 and to adjust an angle of the emergent light. The front windshield compensation lens 41 is disposed on the bracket 42. And the bracket 42 is rotatably disposed on the housing 43. The angle adjusting component 44 is disposed on the housing 43 and connected to the bracket 42, configured to drive the bracket 42 to rotate under control of the head-up controller 6.

The zoom lens assembly 2 comprises a zoom lens for zooming in/out the projection image projected by the displaying component 1, and a first focus adjusting component configured to adjust a focus of the zoom lens.

The image quality compensation lens assembly 3 comprises an image quality compensation lens configured to compensate for an image quality distortion caused during a change of the focus of the zoom lens, and a second focus adjusting component configured to adjust a focus of the image quality compensation lens.

The zoom lens assembly 2 is configured to zoom in/out the projection image projected by the display component 1, and to adjust the focus of the zoom lens by the first focus adjusting component, such that the magnification times of the projection image may be adjusted. The image may be distorted and the image quality may be lessened after zooming in/out the image by the zoom lens assembly 2. Thus, the image quality compensation lens assembly 3 is disposed behind the zoom lens assembly 2 in the optical path of the emergent light. The image quality compensation lens assembly 3 may adjust the image quality due to the change of the optical path by the zoom lens assembly 2, change the focus of the image quality compensation lens regularly, and compensate the image quality in the case that the object plane is stationary, such that the image quality of the projection image projected by the head-up displaying system does not reduce greatly during the change of the focus. Since the front windshield 5 of the vehicle 200 is an arc glass, a pincushion distortion or barrel distortion may occur on the projection image projected onto the windshield 5. For eliminating the distortion, the front windshield compensation lens assembly 4 is disposed in the optical path, and the front windshield compensation lens assembly 4 is configured to adjust the height of the projection image d.

Each of the above-mentioned zoom lens and the image quality compensation lens is a concave mirror. And the front windshield compensation lens 41 is a saddle mirror.

The displaying component 1 may be any known structure. The displaying component 1 comprises a transmission-type displaying screen and an optical source component beneath the transmission-type displaying screen. The optical source generated by the optical source component illuminates the transmission-type displaying screen to project the image displayed on the transmission-type displaying screen. In this embodiment, the optical source component comprises a backlight plate, and backlights distributed on the backlight plate in an array way. As a preferred implementation, the optical source component may also be provided with condensing lenses corresponding respectively to the backlights and distributed in an array way. The condensing lenses may be disposed on the backlight plate directly, or the condensing lenses may cover the backlights. The condensing lenses may also be stuck on a condensing substrate, or integrated with the condensing substrate. The condensing lenses may condense light, improve the utilization of the light, enable the emergent light to be even, and achieve a better irradiation effect.

"a zoom lens assembly 2, an image quality compensation lens assembly 3, and a front windshield compensation lens assembly 4 sequentially disposed in the optical path of the emergent light" means that, the zoom lens assembly 2 is disposed in the optical path of the emergent light of the displaying component 1, the image quality compensation lens assembly 3 is disposed in the optical path of the emergent light of the zoom lens assembly 2, the front windshield compensation lens assembly 4 is disposed in the optical path of the emergent light of the image quality compensation lens assembly 3, and the emergent light of the front windshield compensation lens assembly 4 is projected onto the front windshield 5.

Each of the first focus adjusting component and the second focus adjusting component is not limited to a specific form. As long as the focus adjusting component (first focus adjusting component or second focus adjusting component) is controllable and can change the focus, the focus adjusting component may be controlled electrically or mechanically. The image quality compensation lens and the zoom lens may be collectively called lens. The focus of the image quality compensation lens or the zoom lens may be changed directly and indirectly. For example, by changing the curvature of the lens, the focus may be changed indirectly. The first focus adjusting component may be called a first curvature adjusting component and the second focus adjusting component may be called a second curvature adjusting component. The curvature may be adjusted by means of electric control mode. By affixing a conducting film on the lens and disposing a conducting substrate beneath the lens, an electric field is generated between the conducting film and the conducting substrate and an electrostatic driving force upward or downward is produced. The electrostatic driving force is applied on the lens, such that a deformation of the lens upward or downward is produced to change the curvature of the lens. By changing the value and direction of the voltage of the electric filed, the size and the direction of the electrostatic driving force may be controlled. Therefore, the focus of the head-up displaying system may be changed by changing the voltage applied between the conducting film and the conducting substrate.

The front windshield compensation lens assembly 4 reflects the projection image d onto the windshield 5. After the windshield 5 reflects the projection image d, the eyes a of the driver may view the projection image d (virtual image) formed in front of the windshield 5. If the angle adjusting component 44 rotates the front windshield compensation lens 41, the angle of inclination of the front windshield compensation lens 41 is changed, such that the height of the projection image d is changed. In this way, the height of the projection image d may be adjusted automatically corresponding to different drivers.

Figure 5:
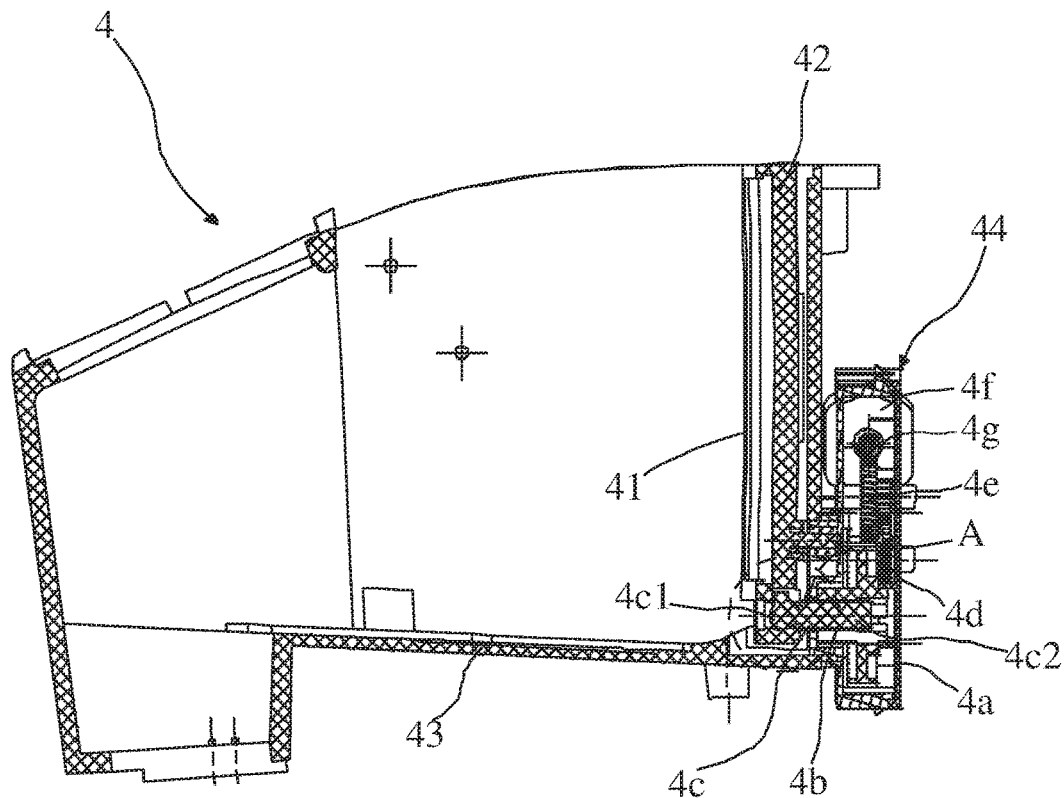
FIG. 5 is a sectional view of a front windshield compensation lens assembly according to a specific embodiment of the present disclosure.
Figure 6:
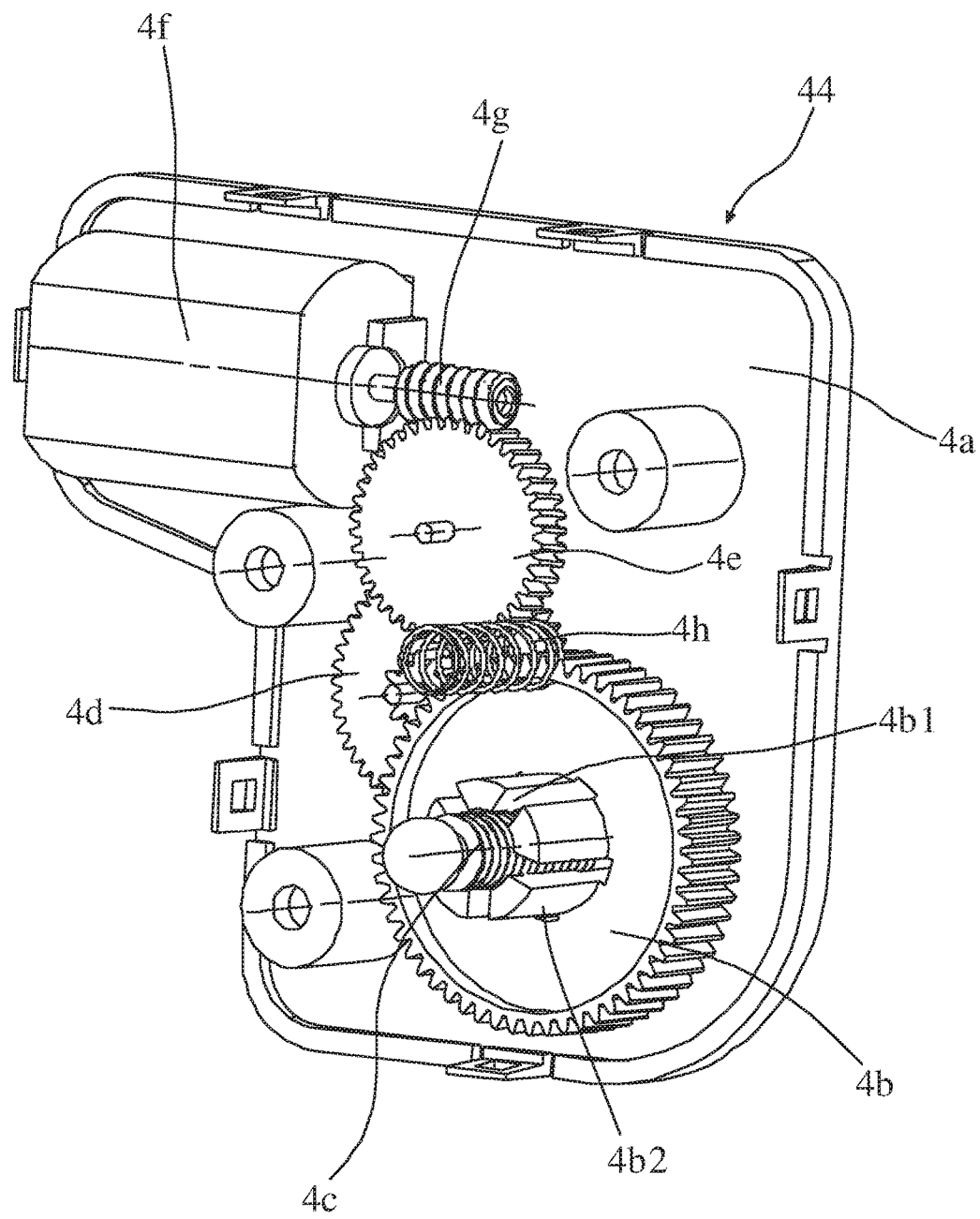
FIG. 6 is a perspective view of a front windshield compensation lens assembly according to a specific embodiment of the present disclosure.

The angle adjusting component 44 is configured to adjust the bracket 42 by rotating the bracket 42 in a tiny angle, so as to adjust the front windshield compensation lens 41 on the bracket 42 in the tiny angle, such that the angle of reflection of the front windshield compensation lens 41 may be changed and the height of the projection image d of the head-up displaying system may be adjusted. The angle adjusting component 44 according to the present disclosure is not limited to a specific structure, as long as it has a function of adjusting the bracket 42 in a tiny angle. In this embodiment, a specific implementation is provided. As shown in FIGS. 5 and 6, the angle adjusting component 44 comprises an adjusting housing 4a, an electric motor 4f, a gear train and a pusher 4c.

The electric motor 4f is connected to the head-up controller 6 and controlled by the head-up controller 6. The electric motor 4f, the gear train and the pusher 4c are disposed in the adjusting housing 4a. The electric motor 4f comprises a screw shaft 4g which is engaged with the gear train. The pusher 4c comprises a pushing end 4c1 connected to a back surface of the bracket 42 and an engaging end 4c2 engaged with the gear train. A rotary motion of the gear train is converted into a liner motion of the pusher 4c because the gear train engages with the pusher 4c. The pusher 4c acts on the bracket 42, i.e. acts on the front windshield compensation lens 41 in the bracket 42 to adjust the angle of reflection of the front windshield compensation lens 41, such that the height of the projection image d may be adjusted.

The electric motor 4f may be a stepper motor. The forward rotation and reversal rotation of the electric motor 4f transmitted by the gear train enables the pusher 4c to screw in/out, such that the angle of reflection of the bracket 42 may be adjusted.

The gear train is configured to transmit the rotary motion of the screw shaft 4g on the electric motor 4f to the pusher 4c. And the rotary motion is converted into a liner motion of the pusher 4c. The number of gears in the gear train is not limited, as long as the gear train can transmit the rotary motion. The number of gears may be set under user's requirements. For example, in this embodiment, the gear train comprises a first gear 4b, a second gear 4d and a third gear 4e. The third gear 4e is engaged with the screw shaft 4g on the electric motor 4f. The second gear 4d is engaged respectively with the first gear 4b and the third gear 4e. The first gear 4b is provided with a female threaded hole in the center. The pusher 4c is provided with a male thread at the engaging end 4c2. The male thread at the engaging end 4c2 is engaged with the female threaded hole on the first gear 4b.

Specifically, the first gear 4b is provided with a convex 4b1 in the center, and the female threaded hole is disposed on the convex 4b1. The convex 4b1 is generally in a form of many disc of claw structure 4b2. The female threaded hole is formed in the center of the claw structure 4b2. The claw structure 4b2 is fastened by a garter spring outside the claw structure 4b2. The claw structure 4b2 is easy to mount, and is used in the overload protection.

The pushing end 4c1 of the pusher 4c is a ball. The back surface of the bracket 42 is provided with a ball mounting aperture 422. The ball is disposed in the ball mounting aperture 422. Also, the housing 43 is provided with a hole for the pusher 4c to pass through. With the structure of the ball, a curvilinear motion of the bracket 42 (the bracket 42 moves forwardly and backwardly or moves upwardly and downwardly) may be implemented. The ball may rotate at arbitrary angle, and move smoothly.

Figure 8:
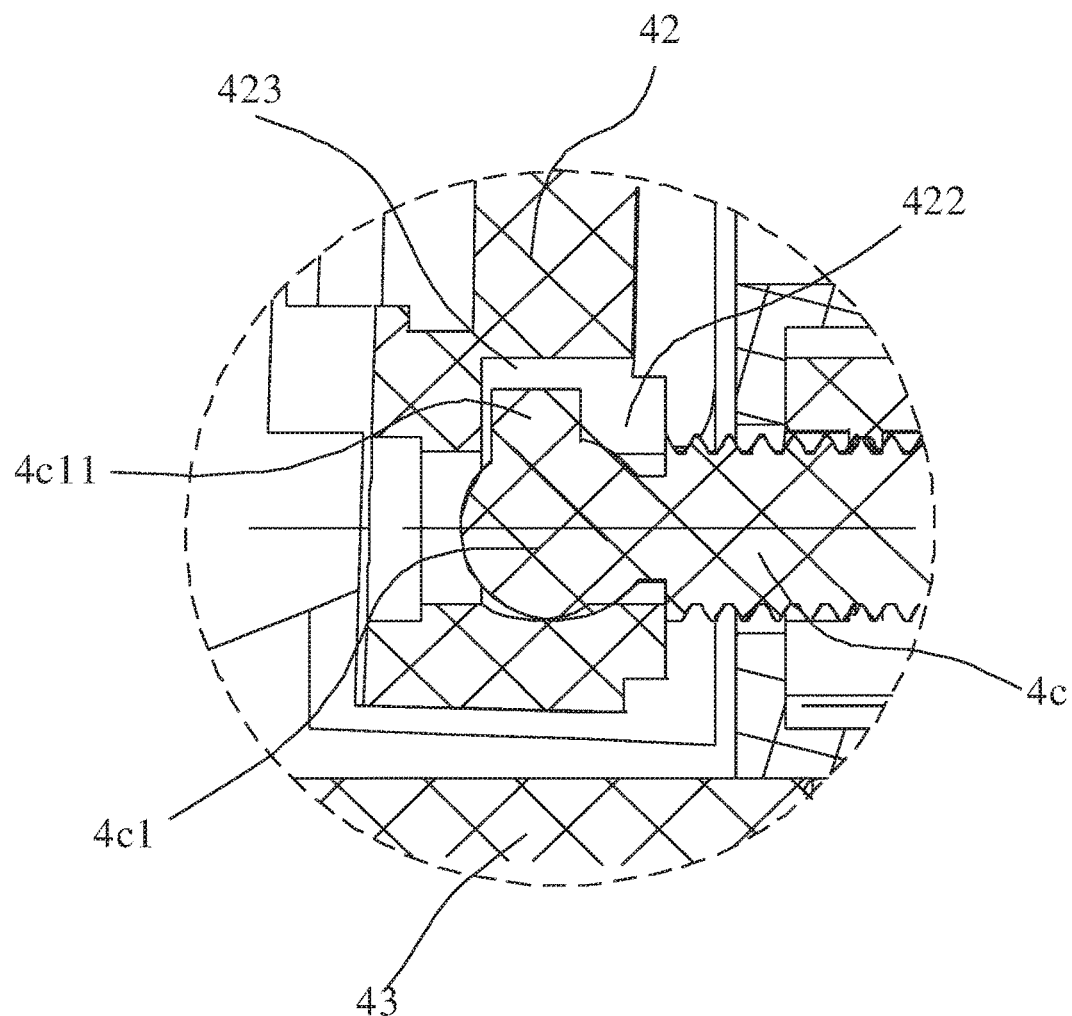
FIG. 8 is an enlarged view of part A in FIG. 5.

What is expected is the linear motion rather than the rotary motion of the pusher 4c. Thus, an anti-rotating structure is provided. The anti-rotating structure according to the present disclosure is not limited to a specific structure, as long as the anti-rotating structure may prevent the pusher 4c from rotating. For example, as shown in FIG. 8, the ball is provided with an anti-rotating projection 4c11, and an anti-rotating groove 423 corresponding to the anti-rotating projection 4c11 is disposed in the ball mounting aperture 422 on the back surface of the bracket 42, such that the rotary motion is limited.

Figure 7:
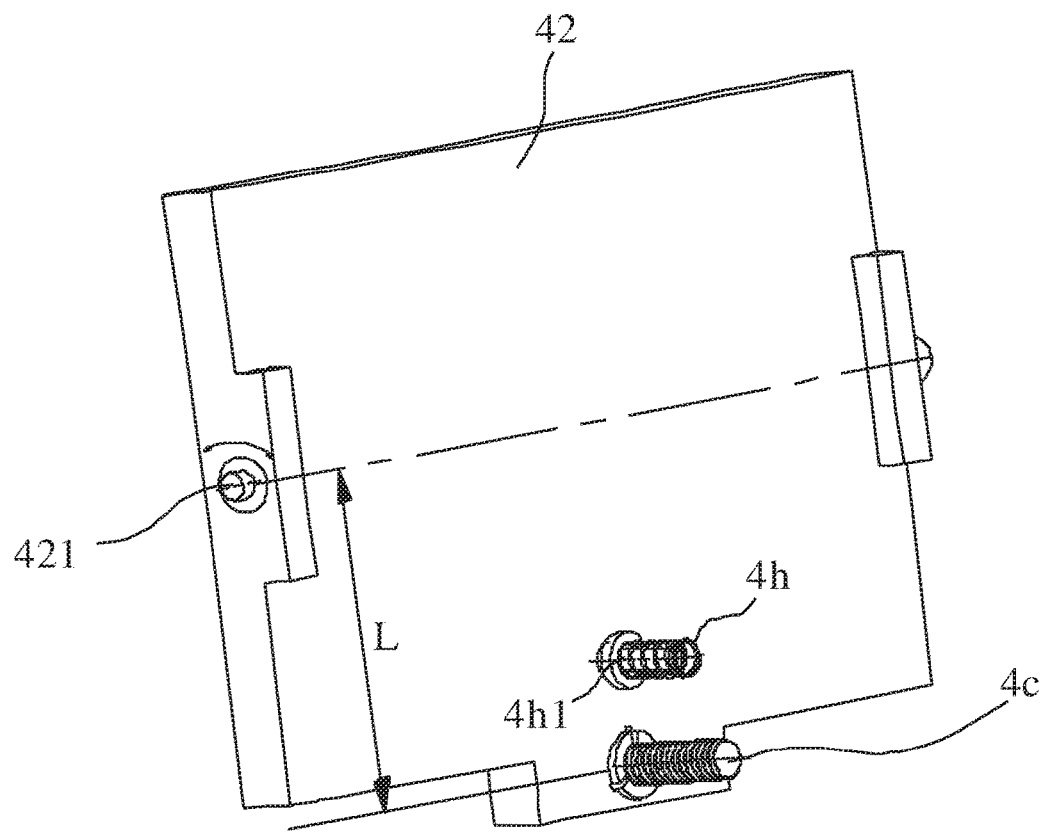
FIG. 7 is a perspective view of a bracket according to a specific embodiment of the present disclosure.

A compression spring 4h is disposed between the housing 43 and the angle adjusting component 44. Specifically, as shown in FIGS. 5-7, the housing 43 is provided with a spring mounting column 4h1 and the angle adjusting component 44 is provided with an opening for the spring mounting column 4h1. The spring mounting column 4h1 is inserted into the opening. The compression spring 4h is disposed surrounding the spring mounting column 4h1. The housing 43 is also provided with a hole for the spring mounting column 4h1 to pass through. The compression spring 4h is provided, such that the gap between the angle adjusting component 44 and the bracket 42 may be adjusted and the bracket 42 is fixed by the interaction between the elastic force of the compression spring 4h and the jacking force from the pusher 4c to the bracket 42.

As shown in FIG. 7, both sides of the bracket 42 are provided with rotation axes 421, and the housing 43 is provided with corresponding axle holes in which the rotation axes 421 are disposed, such that the bracket 42 may rotate about the rotation axes 421. The rotation axes 421 are disposed in the center of the back surface of the bracket 42, and the pusher 4c is disposed at the edge of the back surface of the bracket 42. The distance between the pusher 4c and the rotation axes 421 is L. If L is long enough, the radius of rotation is increased and the adjustment range is increased, such that the bracket 42 may be adjusted in the tiny angle (less than 1°).

The head-up displaying system according to the present disclosure automatically detects the image having locations of the eyes a of the driver and the predetermined reference point c by the camera b, automatically detects the position of the seat e of the driver by the seat detecting module 7 so as to obtain the actual horizontal distance between the seat e and the predetermined reference point c, and then calculates by the head-up controller 6 the actual vertical distance between the eyes a of the driver and the predetermined reference point c and controls the height of the projection image d of the projector 100 according to the actual vertical distance. Without any manual intervenes, the projection image d may be positioned at the appropriate position where the projection image may be viewed by the driver comfortably.

Embodiment 2

As shown in FIG. 1, there is provided a vehicle 200. The vehicle 200 comprises a head-up displaying system disclosed in Embodiment 1.

Only the head-up displaying system on the vehicle 200 is improved, and other parts of the vehicle 200 are unchanged. Since the head-up displaying system is described in detail in Embodiment 1, the head-up displaying system is not described herein.

The vehicle 200 according to the present disclosure comprises the head-up displaying system. The head-up displaying system automatically detects the image having locations of the eyes a of the driver and the predetermined reference point c by the camera b, automatically detects the position of the seat e of the driver by the seat detecting module 7 so as to obtain the actual horizontal distance between the seat e and the predetermined reference point c, and then calculates by the head-up controller 6 the actual vertical distance between the eyes a of the driver and the predetermined reference point c and controls the height of the projection image d of the projector 100 according to the actual vertical distance. Without any manual intervenes, the projection image d may be positioned at the appropriate position where the projection image may be viewed by the driver comfortably.

Embodiment 3

In this embodiment, there is provided a method for adjusting a height of a projection image d of a head-up displaying system. The head-up displaying system is a head-up displaying system described in Embodiment 1.

The method comprises: detecting the image having locations of the eyes a of the driver and the predetermined reference point c by the camera b fixedly disposed in the vehicle and in front of the eyes a of the driver; detecting the position of the seat e of the driver in the vehicle so as to obtain the actual horizontal distance between the eyes a of the driver and the predetermined reference point c in the horizontal direction by the seat detecting module 7; obtaining the image and the actual horizontal distance by the head-up controller 6, processing the image so as to obtain the position relation between the eyes a of the driver and the predetermined reference point c in the image by the head-up controller 6, generating the actual vertical distance between the eyes a of the driver and the predetermined reference point c according to the position relation and the actual horizontal distance by the head-up controller 6, adjusting the height of the projection image d projected by the projector 100 automatically according to the actual vertical distance by the head-up controller 6.

The height of the predetermined reference point c is set as an average height of the eyes a of the driver, and the camera b can photograph both the predetermined reference point c and the eyes a of the driver simultaneously.

Specifically, processing the image so as to obtain the position relation between the eyes a of the driver and the predetermined reference point c in the image comprises: obtaining a coordinate $(x_1, y_1)$ of the eyes of the driver and a coordinate $(x_0, y_0)$ of the predetermined reference point in the image, so as to obtain a line between the eyes of the driver and the predetermined reference point and to obtain a ratio $K=|y_1-y_0|/|x_1-x_0|$ of a height of the line in the vertical direction to a length of the line in the horizontal direction, as shown in FIG. 2a. The length of the line is R. The projected length of the line in the horizontal direction is X, which may be expressed by a formula of $X=|x_1-x_0|$. The projected length of the line in the vertical direction is Y, which may be expressed by a formula of $Y=|y_1-y_0|$. Thus, the ratio of the height to the length is $K=Y/X$. A triangle is constituted by the line, the projected line of the line in the horizontal direction and the projected line of the line in the vertical direction, which may be called a triangle in image. If the coordinate $(x_1, y_1)$ of the eyes a of the driver and the coordinates $(x_0, y_0)$ of the predetermined reference point c are known, the shape of the triangle is determined. Thus, the angle Q1 between the line and the projected line of the line in the horizontal direction, the angle Q2 between the line and the projected line of the line in the vertical direction, the length of each of the line, the projected line of the line in the horizontal direction and the projected line of the line in the vertical direction, and the ratio of the height to the length may be calculated.

As shown in FIG. 2b, in the actual scene, the actual line between the eyes a of the driver and the predetermined reference point c, the projection line of the actual line in the horizontal direction, and the projection line of the actual line in the vertical direction constitute an actual triangle. The actual triangle and the triangle in image are similar triangles. Thus, the angle between the actual line and the projected line of the actual line in the horizontal direction is Q1, the angle between the actual line and the projected line of the actual line in the vertical direction is Q2, and the ratio of the length of projected line of the actual line in the horizontal direction to that of the projected line of the actual line in the vertical direction is K. If the actual horizontal distance L is obtained by the seat detecting module 7, the actual vertical distance $H=K*L$ between the eyes a of the driver and the predetermined reference point c may be calculated with the ratio K and the actual horizontal distance L. And the actual distance between the eyes a of the driver and the predetermined reference point c may be calculated, which is $S=\sqrt{L^2+H^2}$.

Obtaining the actual vertical distance between the eyes a of the driver and the predetermined reference point according to the position relation and the actual horizontal distance obtained comprises: multiplying the actual horizontal distance obtained by the ratio K to obtain the actual vertical distance by the seat detecting module 7.

Both in photographing the image or processing the image, the eyes a of the driver and the predetermined reference point c may be positioned and the coordinates may be obtained. For example, the predetermined reference point c may be defined as a legible image. After the camera b photographs the image, the predetermined reference point c may be positioned by comparing the image with the legible image. Likely, the eyes a of the driver may be positioned through various eyes identification technologies. For example, the eyes a of the driver may be positioned by comparing the eyes a of the driver in a database with eyes pictures. The eyes a of the driver and the predetermined reference point c are put in a same standard reference, such that the coordinates of the eyes a of the driver and the coordinates of the predetermined reference point c may be obtained. Also, the eyes a of the driver and the predetermined reference point c may be positioned by detecting the eyes a of the driver and the predetermined reference point c through an infrared detecting technology. The eyes a of the driver may be positioned by identifying the face of the driver through a face identification technology and calculating the position of the eyes of the driver on the face.

Specifically, obtaining a coordinate $(x_1, y_1)$ of the eyes of the driver and a coordinate $(x_0, y_0)$ of the predetermined reference point in the image comprises: obtaining a position of the eyes a of the driver by the camera b with an infrared light source (i.e. the position of the eyes a of the driver is detected in an active detection way of the common infrared illumination. Based on the physiological characteristic of the eyes, namely the refection of the infrared with different wavelengths by the retina is different, the position of the eyes a of the driver is highlighted in the image, such that the eyes a of the driver may be positioned); defining the predetermined reference point c as a legible image or an image reflecting a specific infrared; positioning the legible image or the image reflecting the specific infrared in the image photographed by the camera b so as to obtain a position of the predetermined reference point c; and placing the eyes a of the driver and the predetermined reference point c in a same standard reference so as to obtain the coordinate ($x_1$, $y_1$) of the eyes a of the driver and the coordinate ($x_0$, $y_0$) of the predetermined reference point c.

As an alternative implementation, obtaining a coordinate ($x_1$, $y_1$) of the eyes of the driver and a coordinate ($x_0$, $y_0$) of the predetermined reference point in the image comprises: identifying a face of the driver in the image according to a face identification technology, and calculating a position of the eyes a of the driver on the face (specifically, with the face database AT&T from the University of Cambridge, the face of the driver may be identified through a face identification technology combined with the Two-dimensional Principal Component Analysis and Fisher Linear Determination Analysis); defining the predetermined reference point c as a legible image, and positioning the legible image in the image photographed by the camera b so as to obtain a position of the predetermined reference point c; placing the eyes a of the driver and the predetermined reference point c in a same standard reference so as to obtain the coordinate ($x_1$, $y_1$) of the eyes a of the driver and the coordinate ($x_0$, $y_0$) of the predetermined reference point c.

Adjusting the height of the projection image d projected by the projector 100 automatically according to the actual vertical distance comprises: controlling actions of the angle adjusting component in the front windshield compensation lens assembly in the projector 100 automatically according to the actual vertical distance by the head-up controller, such that the angle adjusting component controls the bracket in the front windshield compensation lens assembly to rotate; driving the front windshield compensation lens to rotate by the bracket so as to adjust the height of the projection image d projected from the projector 100 automatically.

Controlling actions of the angle adjusting component automatically in the front windshield compensation lens assembly in the projector 100 automatically according to the actual vertical distance by the head-up controller, such that the angle adjusting component controls the bracket in the front windshield compensation lens assembly to rotate comprises: controlling a rotation of the electric motor in the angle adjusting component automatically according to the actual vertical distance, such that the electric motor drives the pusher to move and the pusher pushes the bracket so as to control the bracket to rotate.

With the method for adjusting a height of a projection image d of a head-up displaying system according to the present disclosure, the image having locations of the eyes a of the driver and the predetermined reference point c is automatically detected by the camera b, the position of the seat e of the driver is automatically detected by the seat detecting module 7 so as to obtain the actual horizontal distance between the seat e and the predetermined reference point c, and then the actual vertical distance between the eyes a of the driver and the predetermined reference point c is calculated by the head-up controller 6 and the height of the projection image d of the projector 100 is controlled according to the actual vertical distance. Without any manual intervenes, the projection image may be positioned at the appropriate position where the projection image may be viewed by the driver comfortably.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A head-up displaying system, configured to be applied in a vehicle, and comprising:
    a projector, disposed in the vehicle, and configured to project a projection image onto a front windshield such that the projection image is reflected into eyes of a driver;
    a camera, fixedly disposed in the vehicle and in front of the eyes of the driver, and configured to detect an image having locations of the eyes of the driver and a predetermined reference point;
    a seat detecting module, configured to detect a position of a seat of the driver in the vehicle so as to obtain an actual horizontal distance between the eyes of the driver and the predetermined reference point in a horizontal direction; and
    a head-up controller, configured to obtain the image detected by the camera and the actual horizontal distance detected by the seat detecting module, to process the image so as to obtain a position relation between the eyes of the driver and the predetermined reference point in the image, to generate an actual vertical distance between the eyes of the driver and the predetermined reference point according to the position relation and the actual horizontal distance, and to adjust a height of the projection image from the projector automatically according to the actual vertical distance,
    wherein the projector comprises a display component, and a three-mirror optical assembly positioned in an optical path of an emergent light of the display component and configured to reflect the projection image projected by the display component onto the front windshield such that the front windshield reflects the projection image into the eyes of the driver and comprising:
    a zoom lens assembly;
    an image quality compensation lens assembly; and
    a front windshield compensation lens assembly, configured to compensate for an image distortion caused by the front windshield and to adjust an angle of the emergent light,
    wherein the front windshield compensation lens assembly comprises:
    a housing;
    a bracket, rotatably disposed on the housing;
    an angle adjusting component, disposed on the housing and connected to the bracket, and configured to drive the bracket to rotate under control of the head-up controller; and
    a front windshield compensation lens, disposed on the bracket, and configured to compensate for the distortion caused by the front windshield and to adjust the angle of the emergent light, wherein the angle adjusting component comprises an adjusting housing, an electric motor, a gear train and a pusher; wherein
the electric motor, the gear train and the pusher are disposed in the adjusting housing;
the electric motor is connected to the head-up controller and comprises a screw shaft, the screw shaft is engaged with the gear train;
the pusher has a pushing end connected to a back surface of the bracket and an engaging end engaged with the gear train; and
a rotary motion of the gear train is converted into a liner motion of the pusher.

2. The head-up displaying system according to claim 1, wherein the camera is disposed on a dashboard in the vehicle or on the front windshield or at a top of the vehicle.

3. The head-up displaying system according to claim 1, wherein the zoom lens assembly, the image quality compensation lens assembly and the front windshield compensation lens assembly are sequentially disposed in the optical path of the emergent light.

4. The head-up displaying system according to claim 1, wherein the head-up controller is provided with an image processing module inside or outside;
wherein the image processing module is configured to process the image so as to obtain the position relation between the eyes of the driver and the reference point in the image.

5. A method for adjusting a height of a projection image of a head-up displaying system according to claim 1, comprising:
detecting an image having locations of the eyes of the driver and a predetermined reference point by the camera;
detecting the position of the seat of the driver in the vehicle so as to obtain the actual horizontal distance between the eyes of the driver and the predetermined reference point in the horizontal direction by the seat detecting module;
obtaining the image and the actual horizontal distance by the head-up controller;
processing the image so as to obtain the position relation between the eyes of the driver and the predetermined reference point in the image by the head-up controller;
generating the actual vertical distance between the eyes of the driver and the predetermined reference point according to the position relation and the actual horizontal distance by the head-up controller; and
adjusting the height of the projection image projected from the projector automatically according to the actual vertical distance by the head-up controller.

6. The method according to claim 5, wherein a height of the predetermined reference point is determined as an average height of the eyes of the driver, and the camera is configured to photograph both the predetermined reference point and the eyes of the driver simultaneously.

7. The method according to claim 5, wherein the step of processing the image so as to obtain the position relation between the eyes of the driver and the predetermined reference point in the image comprises:
obtaining a coordinate $(x_1, y_1)$ of the eyes of the driver and a coordinate $(x_0, y_0)$ of the predetermined reference point in the image, so as to obtain a line between the eyes of the driver and the predetermined reference point and to obtain a ratio $K=|y_1-y_0|/|x_1-x_0|$ of a height of the line in the vertical direction to a length of the line in the horizontal direction.

8. The method according to claim 7, wherein the step of obtaining the actual vertical distance between the eyes of the driver and the predetermined reference point according to the position relation and the actual horizontal distance comprises:
multiplying the actual horizontal distance by the ratio K to obtain the actual vertical distance by the seat detecting module.

9. The method according to claim 7, wherein the step of obtaining a coordinate $(x_1, y_1)$ of the eyes of the driver and a coordinate $(x_0, y_0)$ of the predetermined reference point in the image comprises:
obtaining a position of the eyes of the driver by the camera;
defining the predetermined reference point as a legible image or an image reflecting a specific infrared;
positioning the legible image or the image reflecting the specific infrared in the image so as to obtain a position of the predetermined reference point; and
placing the eyes of the driver and the predetermined reference point in a same standard reference so as to obtain the coordinate $(x_1, y_1)$ of the eyes of the driver and the coordinate $(x_0, y_0)$ of the predetermined reference point.

10. The method according to claim 7, wherein the step of obtaining a coordinate $(x_1, y_1)$ of the eyes of the driver and a coordinate $(x_0, y_0)$ of the predetermined reference point in the image comprises:
identifying a face of the driver in the image according to a face identification technology, and calculating a position of the eyes of the driver on the face;
defining the predetermined reference point as a legible image, and positioning the legible image in the image so as to obtain a position of the predetermined reference point;
placing the eyes of the driver and the predetermined reference point in a same standard reference so as to obtain the coordinate $(x_1, y_1)$ of the eyes of the driver and the coordinate $(x_0, y_0)$ of the predetermined reference point.

11. The method according to claim 5, wherein the step of adjusting the height of the projection image projected from the projector automatically according to the actual vertical distance comprises:
controlling actions of the angle adjusting component automatically according to the actual vertical distance by the head-up controller, such that the angle adjusting component controls the bracket to rotate; and
driving the front windshield compensation lens to rotate by the bracket so as to adjust the height of the projection image projected from the projector automatically.

12. The method according to claim 11, wherein the step of controlling actions of the angle adjusting component automatically according to the actual vertical distance by the head-up controller, such that the angle adjusting component controls the bracket to rotate comprises:
controlling a rotation of the electric motor automatically according to the actual vertical distance, such that the electric motor drives the pusher to move and the pusher pushes the bracket to control the bracket to rotate.

13. A vehicle, comprising a head-up displaying system, configured to be applied in a vehicle, and comprising:
a projector, disposed in the vehicle, and configured to project a projection image onto a front windshield such that the projection image is reflected into eyes of a driver;

a camera, fixedly disposed in the vehicle and in front of the eyes of the driver, and configured to detect an image having locations of the eyes of the driver and a predetermined reference point;

a seat detecting module, configured to detect a position of a seat of the driver in the vehicle so as to obtain an actual horizontal distance between the eyes of the driver and the predetermined reference point in a horizontal direction; and a head-up controller, configured to obtain the image and the actual horizontal distance, to process the image so as to obtain a position relation between the eyes of the driver and the predetermined reference point in the image, to generate an actual vertical distance between the eyes of the driver and the predetermined reference point according to the position relation and the actual horizontal distance, and to adjust a height of the projection image from the projector automatically according to the actual vertical distance, wherein the projector comprises a display component, and a three-mirror optical assembly positioned in an optical path of an emergent light of the display component and configured to reflect the projection image projected by the display component onto the front windshield such that the front windshield reflects the projection image into the eyes of the driver and comprising:

a zoom lens assembly;

an image quality compensation lens assembly; and a front windshield compensation lens assembly, configured to compensate for an image distortion caused by the front windshield and to adjust an angle of the emergent light, wherein the front windshield compensation lens assembly comprises:

a housing;

a bracket, rotatably disposed on the housing;

an angle adjusting component, disposed on the housing and connected to the bracket, and configured to drive the bracket to rotate under control of the head-up controller; and a front windshield compensation lens, disposed on the bracket, and configured to compensate for the distortion caused by the front windshield and to adjust the angle of the emergent light, wherein the angle adjusting component comprises an adjusting housing, an electric motor, a gear train and a pusher; wherein the electric motor, the gear train and the pusher are disposed in the adjusting housing;

the electric motor is connected to the head-up controller and comprises a screw shaft, the screw shaft is engaged with the gear train;

the pusher has a pushing end connected to a back surface of the bracket and an engaging end engaged with the gear train; and a rotary motion of the gear train is converted into a liner motion of the pusher.

\* \* \* \* \*